United States Patent [19]

Dale et al.

[11] 3,931,369
[45] Jan. 6, 1976

[54] CARBURETOR IDLE SYSTEM FUEL ATOMIZER

[75] Inventors: Dennis L. E. Dale, Benfleet; Anthony S. D. Dedman, Cheltenham; John G. Donnelly, Maldon; Frank T. Newbury, Dunmow, all of England

[73] Assignee: Ford Motor Company, Dearborn, Mich.

[22] Filed: May 9, 1974

[21] Appl. No.: 468,790

[30] Foreign Application Priority Data
Nov. 16, 1973 United Kingdom............... 53331/73

[52] U.S. Cl............ 261/41 D; 123/26; 261/DIG. 78
[51] Int. Cl.² .......................................... F02M 3/08
[58] Field of Search............ 261/DIG. 78, 41 D, 63; 123/26

[56] References Cited
UNITED STATES PATENTS

| | | | |
|---|---|---|---|
| 3,143,401 | 8/1964 | Lambrecht............... | 261/DIG. 78 X |
| 3,252,539 | 5/1966 | Ott et al...................... | 261/41 D X |
| 3,437,320 | 4/1969 | Walker et al................ | 261/41 D X |
| 3,544,083 | 12/1970 | Cuaric...................... | 261/DIG. 78 X |
| 3,814,389 | 6/1974 | August...................... | 261/DIG. 78 X |

Primary Examiner—Tim R. Miles
Assistant Examiner—William Cuchlinski, Jr.
Attorney, Agent, or Firm—Robert E. McCollum; Keith L. Zerschling

[57] ABSTRACT

A downdraft type carburetor having a conventional idle speed air/fuel mixture channel has an air/fuel mixing chamber that mixes the idle channel air/fuel mixture with idle bypass air from the main induction passage, the mixing chamber being connected to discharge into the induction passage below the throttle valve through a nozzle containing an orifice sized with respect to a larger orifice in the air bypass passage to provide a pressure differential creating sonic flow, the nozzle extending so that the sonic flow is followed by a shock wave, the turbulence created atomizing the fuel.

2 Claims, 1 Drawing Figure

U.S. Patent   Jan. 6, 1976   3,931,369
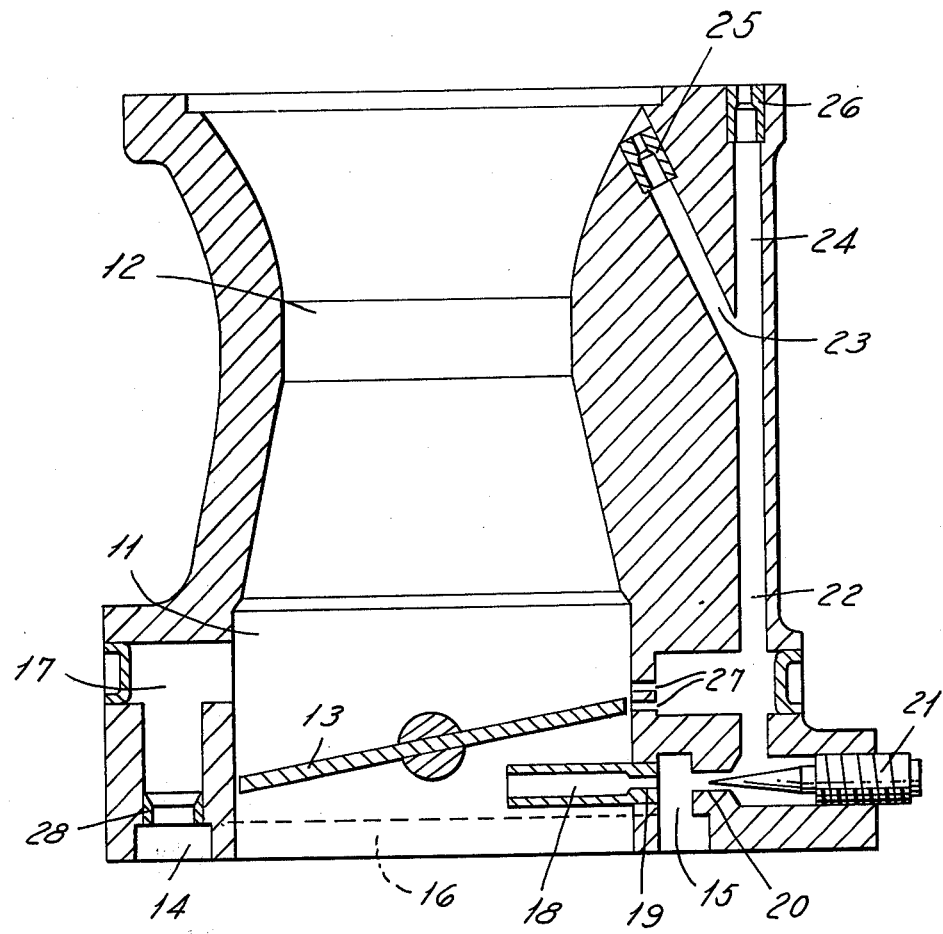

CARBURETOR IDLE SYSTEM FUEL ATOMIZER

This invention relates to a carburetor and in particular to the idle speed air/fuel supply system of a carburetor.

Co-pending application Ser. No. 259,418, "Air Valve Carburetor", filed June 5, 1972, in the name of Victor L. Hailstone et al, now abandoned and U.S. Pat. No. 3,829,069, "Air Valve Carburetor with Engine Starting Fuel Enrichment Means," Victor L. Hailstone et al, and with this case having a common assignee, describe and claim a carburetor designed to achieve sonic air flow velocity during idle speed operation. Flow at sonic velocity creates turbulence by the lesser dense air particles bombarding the fuel particles at sonic velocities, and shock waves which are effective for atomizing the fuel and producing good mixing between fuel and air by the air molecules suddenly being decelerated while the heavier fuel particles continue to bombard the air molecules in their paths.

According to the present invention a carburetor has the following features:

a. a carburetor body has an induction passage open to atmospheric pressure at one end and adapted to be connected to an engine intake manifold at the opposite end;

b. a throttle valve in the induction passage has an engine idle speed position in which it substantially closes the induction passage;

c. an idle speed air-by-pass channel extends from a location upstream of the throttle to a mixing chamber;

d. fuel or fuel/air mixture is discharged into the mixing chamber from a conventional idle speed fuel/air mixture channel;

e. an idle speed discharge passage connects the mixing chamber to the induction passage downstream of the throttle valve;

f. a restriction in the idle speed air by-pass channel is sufficiently large relative to an orifice in the idle speed discharge passage to insure that during idle operation the ratio of pressure in the by-pass channel to manifold pressure is sufficiently high to create flow at sonic velocity through the idle discharge orifice.

The throttle valve is substantially closed at idle so that substantially all the idle fuel/air mixture passes through the sonic flow region in the idle discharge passage. The carburetor will function correctly if the throttle valve is completely closed at idle, but in practice it is not possible to avoid some leakage around the throttle valve and the throttle valve may be just clear of the walls of the induction passage to avoid jamming of the throttle valve.

It is an object of the invention, therefore, to provide a carburetor with an idle speed fuel/air mixture channel that contains a device in the discharge end effecting sonic velocity to the discharge and subsequent shock waves to atomize the fuel and improve emissions.

Other objects, features and advantages of the invention will become more apparent upon reference to the succeeding detailed description thereof, and to the drawing illustrating the preferred embodiment thereof.

The invention will now be described with reference to the drawing in which the single FIGURE is a simplified axial cross-section of a single venturi downdraft carburetor embodying the invention.

The invention concerns the idle system of a fixed area jet type of carburetor. In the interests of clarity, only the elements essential to an understanding of the idle system are shown in the drawing.

A carburetor body 10 has an induction passage 11 with a fixed area venturi section 12. The upper end of the induction passage is open to the atmosphere through an air cleaner, not shown. The lower end of the induction passage is connected to the induction manifold (also not shown) of an internal combustion engine.

A throttle valve 13 is pivotally mounted on the body 10 within the induction passage 11 downstream of the venturi section 12.

An idle air by-pass channel 14 has an inlet 17 to the induction passage between the venturi section and the throttle valve and extends from one side of the carburetor to a mixing chamber 15 at the opposite side through a semi-circular passage 16.

An idle discharge nozzle 18 projects into the induction passage below the throttle valve 13 and connects the mixing chamber 15 to the induction passage. An idle discharge orifice 19 is disposed in the mixing chamber end of the idle discharge nozzle.

A fuel/air mixture enters the mixing chamber 15 through a restriction 20 controlled by an adjustable needle 21. The fuel/air mixture is supplied to the restriction 20 along an idle mixture channel 22 which communicates with the induction passage upstream of the venturi through an air passage 23 and with the carburetor fuel bowl (not shown) through a fuel passage 26.

The air passage 23 has a restrictor 25 and the fuel passage 24 has a restrictor 25.

Transfer ports 27 are connected with the idle mixture channel 22 and open into the induction passage adjacent to the throttle valve in the idle position. These parts are traversed by the blade of the throttle valve as it is moved off idle to decrease the air in the idle mixture and to provide an enriched fuel/air mixture appropriate to off-idle conditions.

The throttle valve 13 is substantially closed during idle operations so that substantially all the idle mixture flows through the idle discharge nozzle 18. A calibrated restrictor 28 in the idle air by-pass channel 14 ensures that at idle a predetermined depression is maintained in the mixing chamber 15, in order to provide a metering vacuum to the idle passage 22. This predetermined depression is such that the pressure drop along the idle discharge nozzle 18 is sufficient to produce flow at sonic velocity through the idle discharge orifice 19. The theoretical condition for flow at sonic velocity with dry air is:

$$\frac{\text{Mixing chamber pressure}}{\text{Manifold vacuum}} = 1.892$$

But in practice we have found that because an air/fuel mixture rather than dry air passes through the idle discharge orifice, flow at sonic velocity may occur when the pressure difference is somewhat less than would be necessary to meet this condition.

In order to achieve this condition it is necessary that the idle discharge orifice 19 is substantially smaller than the idle/air by-pass restriction 28.

The idle mixture restriction 20 is sufficiently small compared to the idle air by-pass restriction 28 that adjustment of the idle mixture needle 21 does not disturb the conditions for sonic flow through the idle discharge orifice 19.

In idle operation, fuel from the passage 24 is mixed with air from the air passage 23 in channel 22 and mixes with air from the transfer ports 27. A metered fuel/air mixture then passes through the idle mixture restriction 20 into the mixing chamber 15 where it is diluted by the air flowing through the by-pass channel 16 to substantially the air-fuel ratio required for idle operation. The idle mixture then passes at sonic velocity through the idle discharge restriction 19. The turbulence thus created aids atomization of the fuel and insures good mixing of the fuel and air. Further fuel atomization and mixing occurs as the mixture passes downstream of the orifice 19 in the idle discharge nozzle 18 because sonic shock waves created at the idle discharge orifice are propagated along the idle discharge nozzle.

Since the throttle valve is substantially closed there is only marginal dilution of the idle mixture in the induction passage. The idle mixture is sufficiently well mixed in the carburetor described that it is possible to use substantially leaner idle mixtures without detriment to the smooth running of the engine and thereby reduce emissions of carbon monoxide and hydrocarbons when the engine is idling. We have found that atomization of the fuel is so complete that a cold engine will idle without fuel enrichment.

We claim:

1. A carburetor idle speed fuel atomizer comprising, in combination, an engine carburetor having an induction passage open to atmospheric pressure at one end and adapted to be connected to an engine intake manifold at the opposite end so as to be subject to engine vacuum varying in level from ambient atmospheric pressure at engine shutdown to a maximum subatmospheric pressure level during engine deceleration operating conditions, a throttle valve rotatably mounted across said passage and movable from an engine idle speed position essentially closing the induction passage to a wide open throttle position, and return, for controlling flow through the passage, the carburetor including an idle speed air and fuel supply system including a fuel/air mixture passage containing fuel and air connected to the induction passage around the throttle valve and having a discharge end connected to the induction passage below the closed throttle position so as to provide an idle air/fuel mixture during engine running operation even though the throttle valve is in a closed position, the fuel/air mixture passage having idle transfer ports connecting the latter passage to the induction passage adjacent the edge of the throttle valve when in an idle speed position for the subjection of the fuel/air mixture passage to the pressure of the induction passage above and below the throttle valve, the idle speed system including a mixing chamber connected at one end to the discharge end of the fuel/air mixture passage and at its other end to the induction passage, the idle speed system also including an additional air passage connected at one end to the induction passage above the throttle valve and connected at its other end to the mixing chamber to dilute the idle speed fuel/air mixture to the desired fuel/air ratio for idling purposes, the atomizer comprising an elongated tube projecting into the induction passage and having a nozzle in the other end of the mixing chamber and having an air/fuel flow opening of a size in proportion to the level of manifold vacuum acting thereon to provide sonic velocity to the flow therethrough to atomize the fuel particles in the flow, the additional air passage having a flow restriction therein sufficient to create a pressure depression in the idle speed mixing chamber upon operation of the engine to effect induction of the air and fuel into the mixing chamber from the idle speed fuel/air mixture passage, the nozzle cross-sectional area being smaller than that of the flow restriction to provide the pressure differential across the nozzle sufficient to provide the sonic flow.

2. An atomizer as in claim 1, including an adjustable needle valve between the end of the fuel/air mixture passage and mixture chamber to variably control the flow area for the flow of fuel/air mixture to the chamber.

* * * * *